Patented Sept. 16, 1924.

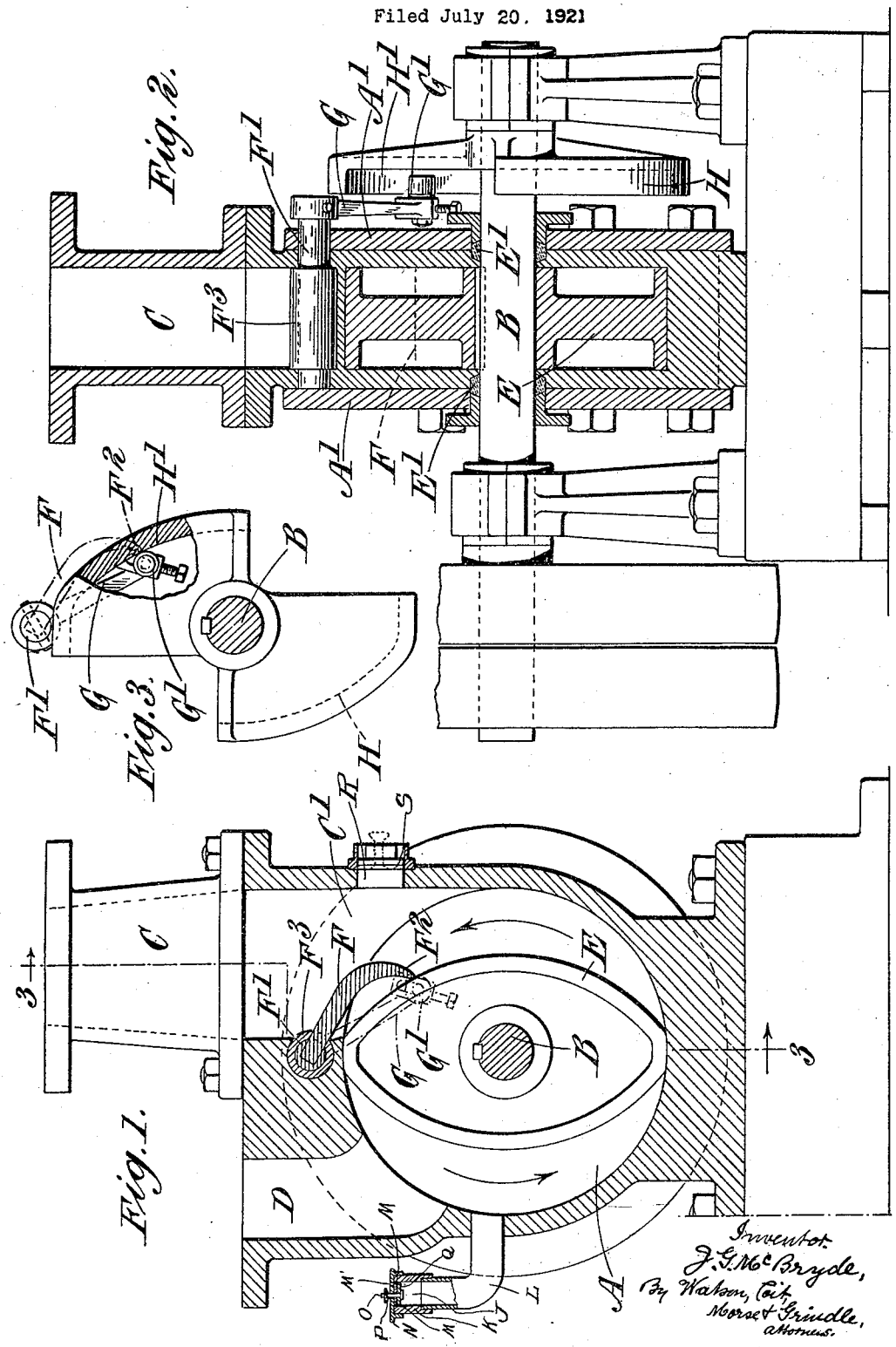

1,509,051

UNITED STATES PATENT OFFICE.

JAMES GRAHAM McBRYDE, OF ROMFORD, ENGLAND, ASSIGNOR TO PULCO SUPPLIES LIMITED, OF LONDON, ENGLAND, A COMPANY OF GREAT BRITAIN.

ROTARY PUMP.

Application filed July 20, 1921. Serial No. 486,039.

*To all whom it may concern:*

Be it known that I, JAMES GRAHAM McBRYDE, a subject of the King of England, and residing at Romford, Essex, in England, have invented certain new and useful Improvements in Rotary Pumps, of which the following is a specification.

This invention relates to rotary pumps or like apparatus for delivering pulverized plastic or viscous substances and has for its object to provide apparatus whereby such substances can be readily conveyed or pumped. Various attempts to pump or convey such substances have been made but apparatus previously proposed has proved unsatisfactory and has failed to give practical results.

According to this invention the apparatus comprises a closed substantially cylindrical chamber having an inlet port and a discharge conduit leading tangentially from the chamber thus forming an enlargement preferably at the top of the cylindrical chamber. An approximately elliptical rotor, preferably having flattened ends, is mounted to rotate within the chamber, the ends of the rotor making sliding contact with the circumferential wall of the chamber, and a pivoted flap or scraper is disposed below the discharge opening means being provided to maintain the end of the flap in constant engagement with the circumferential periphery of the rotor. The relative dimensions of the flap and discharge port are such that the latter is never fully closed, though its cross sectional area is restricted when the flap lifts under the action of the rotor.

The inner walls of the chamber and discharge conduit are free from any recesses or projections, so that none of the substance passing through the chamber can accumulate and so disturb the operation of the apparatus, and the cross section of the discharge conduit is so designed as to prevent clogging and ensure regular delivery of the substance discharged by the rotor.

The pivoted flap has two functions; its free end, which is preferably curved downwards and provided with a knife edge, serves to remove any pulverized or plastic material adhering to the periphery of the rotor, while the upper face of the flap prevents material delivered by the rotor into the discharge chamber and conduit being carried back to the inlet side of the chamber, the oscillation of the flap under the rotary movement of the elliptical or cam-like rotor further assisting in the discharge of the material under treatment.

As an additional means of preventing clogging of the pulverized or plastic material in the suction side of the chamber, an adjustable air inlet or snifting valve may be provided a short distance below the inlet port, through which a regulatable amount of air is drawn as the rotor revolves. This valve can be entirely closed if desired, as for instance when dealing with nearly fluid substances and its construction is such that no pockets are formed in the wall of the chamber in which the material or substance under treatment can accumulate.

One construction of apparatus particularly designed for use with pulverized coal but capable of being used for other powdered, plastic or viscous substances is illustrated by way of example in the accompanying drawings, in which:—

Figure 1 is a side elevation, partly in section.

Figure 2 is a vertical cross section on the line 3—3 of Figure 1 showing the flap-actuating cam in end elevation, and Figure 3 shows this cam in side elevation.

The apparatus comprises a substantially cylindrical chamber A, the ends of which have bolted to them suitable plates or covers A′ carrying bearings for a horizontal shaft B passing through the centre of the chamber. Leading tangentially into the chamber from the top thereof is a discharge conduit C, the lower end of which, communicating with the chamber A, is preferably tapered so as to form an enlarged space C′ near the top of the chamber covering approximately one quarter of the circumference of the chamber. For the remaining three-quarters of its circumference, the chamber is a true circle and leading into the upper part of the chamber on the opposite side of its vertical axis to the discharge conduit C is an inlet or suction port D of suitable dimensions.

Keyed to the horizontal shaft passing through the centre of the chamber is an approximately elliptical rotor E having packing rings E′ around the shaft to engage the inner faces of the cover plates A′ and provided with flattened ends adapted to make sliding contact with the circumferential wall of the chamber.

Mounted upon a horizontal pivot F' above the vertical axis of the rotor and lying in the enlarged chamber C' below the discharge port, is a flap or scraper F, the free end F² of which is bent downwards and provided with a knife edge held constantly in contact with the periphery of the rotor. The means employed to maintain these parts in contact may vary—thus a spring or counterweight may be employed, or the weight of the flap itself may suffice.

The particular mechanism illustrated comprises an arm or lever G secured to an extension of the pivot F' which projects outside the chamber. The lower end of this arm carries an adjustable cam roller G' engaging the working face H' of a cam H keyed to the rotor shaft B but rotating outside the chamber A. The arrangement is such that whereas the ends of the rotor lift the flap, the cam surfaces H' by cooperating with the roller G' maintain the edge of the scraper in sliding contact with the curved walls of the rotor. As shown, the flap F is curved, its curvature approximating to that of the wall of the chamber A although the flap does not form a continuation of this wall. The end F² of the flap is downturned, as shown, and its total length is such that at no point in the revolution of the rotor does the flap entirely close the discharge opening C'. The pivot of the flap is entirely enclosed within a sleeve or housing F³ which protects it from contact with the material under treatment. Just below the inlet port and on the suction side of the chamber an adjustable air inlet valve J may be provided (which can be wholly closed if desired) through which air is drawn by the rotor to prevent the material fed or drawn through the inlet port becoming clogged or too tightly packed in the suction side of the apparatus.

The valve J comprises a cylindrical member K having a closed end and screwed on to the end of an air inlet pipe L. The member K has slots M cut in its closed end and is provided with a rotatable cap N adapted normally to close the slots M but provided with slots M' therein, which can be caused to register with the slots M by rotating the cap whereby a variable quantity of air can be admitted through such slots. A stud O is provided which projects from the centre of the closed end of the member K and passes through a hole in the cap N and this stud has a milled nut P thereon adapted when screwed down to lock the cap N in any desired position. The stud O projects through the closed end of the member K and carries loosely mounted on its lower end a diaphragm Q adapted to lift so as to close the slots M if any air or material tends to flow from the chamber A to the atmosphere.

Disposed at the point where the discharge conduit C branches off from the cylindrical chamber A is an auxiliary clearing outlet R normally closed by a sliding shutter S and adapted to be opened when it is desired to clear the pump of material after the completion of a pumping operation.

The operation of the apparatus is as follows:—

Material to be pumped or conveyed is continuously drawn or fed into the suction side of the chamber through the suction port D, the rotor E which revolves in an anti-clockwise direction, forcing this material (to which any desired addition of air through the adjacent air inlet valve J has been supplied) to the discharge port C'. At this point the free edge F' of the scraper F removes any material adhering to the periphery of the rotor and, as the flap oscillates under the action of the elliptical surface of the rotor, it acts as an agitator and additional means for discharging the material through the outlet port, the area of the scraper being less than the cross sectional area of the port C', so that the latter is never fully closed. Further, the flap F serves to prevent any powdered or other substance being carried from the discharge side of the chamber back to the suction side.

The walls of the chamber and of the discharge conduit leading therefrom and forming a portion thereof are entirely free from any recesses, pockets or projections upon which the material under treatment can accumulate and so disturb the working of the machine. Further where any internal flanges or the like are necessary they are pared off to form knife edges where they meet so that none of the material under treatment can accumulate.

It is to be understood that the constructional details of the apparatus can be varied in accordance with the dimensions of the rotor and chamber and with the particular substance under treatment and further that the position of the inlet and outlet ports with relation to the central axis of the apparatus may be changed in accordance with circumstances without departing from this invention.

What I claim as my invention and desire to secure by Letters Patent is:—

1. In apparatus for delivering pulverized or viscous substances, the combination of a substantially cylindrical chamber having an inlet port therein, a discharge conduit leading tangentially into the chamber, an elliptical rotor mounted within the chamber so that its ends make sliding contact with the circumferential wall of the chamber, an adjustable air inlet valve communicating with the chamber between the inlet and discharge ports, a curved pivoted scraper having a knife edge, and means for holding the knife edge of the scraper in constant engagement with the periphery of the motor, the inner walls of the chamber and discharge conduit being free from any recesses or projections and the scraper and discharge conduit being so formed that the latter is never wholly closed while the scraper constitutes a flap adapted to assist in discharging the material under treatment as set forth.

2. In apparatus for delivering pulverized or viscous substances, the combination of a substantially cylindrical chamber having an inlet port therein, a discharge conduit leading tangentially into the chamber, an elliptical rotor mounted within the chamber so that its ends make sliding contact with the circumferential wall thereof, an adjustable air inlet valve communicating with the chamber between the inlet and discharge ports, a curved pivoted scraper having a knife edge, means for holding the knife edge of the scraper in constant engagement with the periphery of the rotor, an auxiliary clearing outlet disposed at the point where the discharge conduit branches off from the cylindrical chamber and means for normally closing the auxiliary outlet, the inner walls of the chamber and discharge conduit being free from any recesses or projections and the scraper and discharge conduit being so formed that the latter is never wholly closed while the scraper constitutes a flap adapted to assist in discharging the material under treatment as set forth.

In testimony whereof I have signed my name to this specification.

JAMES GRAHAM McBRYDE.